United States Patent
Krishnappa (10) Patent No.: US 8,256,000 B1
(45) Date of Patent: Aug. 28, 2012

(54) METHOD AND SYSTEM FOR IDENTIFYING ICONS

(75) Inventor: Bhaskar Krishnappa, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 367 days.

(21) Appl. No.: 12/612,550

(22) Filed: Nov. 4, 2009

(51) Int. Cl.
*G06F 12/14* (2006.01)

(52) U.S. Cl. ......................................................... 726/24

(58) Field of Classification Search .................. None
See application file for complete search history.

(56) References Cited

U.S. PATENT DOCUMENTS

| | | | |
|---|---|---|---|
| 7,421,587 B2 * | 9/2008 | Cowie et al. | 713/188 |
| 2009/0144660 A1 * | 6/2009 | Wako | 715/835 |
| 2009/0224867 A1 * | 9/2009 | O'Shaughnessy et al. | 340/5.1 |

* cited by examiner

*Primary Examiner* — Brandon Hoffman
(74) *Attorney, Agent, or Firm* — McKay and Hodgson, LLP; Serge J. Hodgson; Sean P. Lewis (57) ABSTRACT

A method and apparatus for indentifying Icons whereby a known/clean file Icon database is created that includes Icon image data and/or .ico files associated with known icons of selected applications. The resource section of any file being transferred to, or through, a given user computing system is then stripped and scanned for .ico files and any .ico files identified are extracted. Then for each directory extracted from the identified .ico files, the relevant image data is extracted. The known/clean Icon image data is obtained from the known/clean file Icon database. The extracted relevant image data is then compared with known/clean Icon image data and, if the extracted relevant image data matches with the known/clean Icon image data to a desired level of accuracy, a status of the extracted .ico files, and/or given file, is transformed indicate a status of Icon match.

20 Claims, 4 Drawing Sheets

METHOD AND SYSTEM FOR IDENTIFYING ICONS

BACKGROUND OF THE INVENTION

One major issue facing modern communications systems, such as the Internet, is the prevalence and propagation of computer malware, or "malware". Herein, malware includes, but is not limited to, any software and/or code designed to infiltrate a user's computing system without the user's informed and/or explicit consent. Some of the better known forms of malware include computer viruses and spyware.

Many types of computer malware are formatted as Portable Executables or "PEs". PE format is a data structure that encapsulates the information necessary for the Windows OS loader to manage the wrapped executable code. This includes dynamic library references for linking, API export and import tables, resource management data and thread-local storage (TLS) data. On NT operating systems, the PE format is used for EXE, DLL, OBJ, SYS (device driver), and other file types. The Extensible Firmware Interface (EFI) specification states that PE is the standard executable format in EFI environments.

Due to the widespread, and now relatively well known, problem of malware propagation, many users are hesitant to open, or activate, an unknown PE file. Consequently, in order to hide the nature of the PE file malware, many PE file malware distributors use advanced "social engineering" techniques to trick a user into activating PE file malware and/or to lure a user into complacency by presenting the user with known and/or trusted features. For instance, in many instances of targeted and/or password stealing malware, such as the bankers Trojan malware, malware distributors disguise their malware as a legitimate document, notepad text, PDF, etc. by including a well known, and/or trusted, Icon to convince the user that the PE file malware is a legitimate document created in the application format indicated by/represented by the Icon. Consequently, in many cases, it would be beneficial to identify Icons to help identify and/or isolate certain files that potentially include certain forms of malware.

Currently, some security systems do attempt to identify Icons. However, these currently available security systems typically analyze potential Icons using hashing systems such as the well known MD5 hash. Unfortunately, using hashing systems, even a small, and virtually unnoticeable, change to a given Icon, such as a minor change in color shade or even the addition or removal of a single image pixel, can cause the Icon to go unidentified, thereby defeating the hash analysis, while still appearing quite legitimate to the user. Consequently, there is currently no efficient and effective mechanism available to reliably and dynamically identify an Icon. In addition, hashing systems are extremely resource intensive in that they typically require large MD5 databases and consume significant processing cycles.

As a result of the situation described above, many users are currently taken in, and induced to activate malicious PE files, by seemingly legitimate and trusted Icons.

SUMMARY

According to one embodiment of a method and apparatus for identifying Icons, the fact that virtually every PE file that includes an Icon has an associated .ico file in its resource section, and that the .ico file has a well defined format, is used to identify Icons. In one embodiment, a known/clean file Icon database is created that includes Icon image data and/or .ico files associated with known icons of selected applications such as, but not limited to: the Microsoft Word word processing program; the Microsoft Excel spreadsheet program; the Microsoft Paint graphics program; the Microsoft PowerPoint display program; the Microsoft Visio graphics program; JPEG; PDF; etc. In one embodiment, the resource section of any file being transferred to, or through, a given user computing system is stripped and scanned for .ico files. In one embodiment, any .ico files identified are extracted. In one embodiment, the relevant image data is extracted from the identified .ico files. In one embodiment, known/clean Icon image data is obtained from the known/clean file Icon database. In one embodiment, the extracted relevant image data from the identified .ico files is compared with the known/clean Icon image data obtained from the known/clean file Icon database. In one embodiment, if the extracted relevant image data from the identified .ico files matches with known/clean Icon image data obtained from the known/clean file Icon database to a desired level of accuracy, data indicating a status of the extracted .ico files, and/or given file/e-mail, is transformed to data indicating a status of Icon match and the file/e-mail is subjected to further analysis deemed appropriate for a file that includes an Icon.

The .ico file format is an image file format used for icons in the Microsoft Windows operating system. Typically .ico files contain one or more small images at multiple sizes and color depths. The official IANA registered MIME type for ico files is image/vnd.microsoft.icon.

The file structure for .ico files is as follows, with all values represented in little-endian (Intel standard) format.

| Icon #1 | The actual "data" for the first image in old AND/XOR DIB format or newer PNG |
| --- | --- |
| ... | |
| Icon #n | Data for the last icon image |

| Offset# | Size | Purpose |
| --- | --- | --- |
| | | Header |
| 0 | 2 | reserved. should always be 0 |
| 2 | 2 | type. 1 for icon (.ICO), 2 for cursor (.CUR) file |
| 4 | 2 | count; number of images in the file |
| | | Directory |
| 0 | 1 | width, should be 0 if 256 pixels |
| 1 | 1 | height, should be 0 if 256 pixels |
| 2 | 1 | color count, should be 0 if more than 256 colors |
| 3 | 1 | reserved, should be 0 |
| 4 | 2 | color planes when in .ICO format, should be 0 or 1, or the X hotspot when in .CUR format |
| 6 | 2 | bits per pixel when in .ICO format, or the Y hotspot when in .CUR format |
| 8 | 4 | size in bytes of the bitmap data |
| 12 | 4 | offset, bitmap data address in the file |

In one embodiment, the fact that virtually every PE file that includes an Icon has an associated .ico file in its resource section, and that the .ico file has a well defined format, as shown above, is used to identify Icons.

In one embodiment, the known/clean file Icon database includes .ico files associated with known icons of selected applications such as, but not limited to: the Microsoft Word word processing program; the Microsoft Excel spreadsheet program; the Microsoft Paint graphics program; the Microsoft PowerPoint display program; the Microsoft Visio graphics program; JPEG; PDF; etc.

In one embodiment, the known/clean file Icon database includes Icon image files associated with known icons of selected applications such as, but not limited to: the Microsoft Word word processing program; the Microsoft Excel spreadsheet program; the Microsoft Paint graphics program; the Microsoft PowerPoint display program; the Microsoft Visio graphics program; JPEG; PDF; etc.

In one embodiment, the known/clean file Icon database includes both .ico files associated with known icons of selected applications and Icon image files associated with known icons of selected applications.

In one embodiment, the known/clean file Icon database is a data storage device, a designated server system or computing system, or a designated portion of one or more server systems or computing systems, and/or security system provider computing systems, or a distributed database, or an external and/or portable hard drive. In one embodiment, the known/clean file Icon database is a dedicated mass storage device implemented in software, hardware, or a combination of hardware and software. In one embodiment, the known/clean file Icon database is a web-based function. As discussed in more detail below, in one embodiment, the known/clean file Icon database is under the control of, or otherwise accessible by, a process for indentifying Icons, and/or a provider of a security system and/or a security system provider computing system. In one embodiment, the known/clean file Icon database is part of a cloud computing environment.

In one embodiment, any file being transferred to, or through, a given user computing system is intercepted by a security system residing locally and/or remotely from the given user computing system.

In one embodiment, the resource section of any file being transferred to, or through, the given user computing system is stripped and scanned for .ico files using a security system and/or one or more processors associated with one or more computing systems, such as user or security system provider computing systems.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, any .ico files identified are extracted from the resource section of any file being transferred to, or through, a given user computing system using a security system and/or one or more processors associated with one or more computing systems, such as user or security system provider computing systems.

In one embodiment, the directory count and image size data is extracted from the identified and extracted .ico files using a security system and/or one or more processors associated with one or more computing systems, such as user or security system provider computing systems.

In one embodiment, the directory count extracted from the identified .ico files is analyzed using a security system and/or one or more processors associated with one or more computing systems, such as user or security system provider computing systems to determine the number of directories present in the .ico files.

In one embodiment, for each directory of the directory count extracted from the identified .ico files, the relevant image data is extracted using a security system and/or one or more processors associated with one or more computing systems, such as user or security system provider computing systems and the relevant image data is stored in any memory system or device and/or by any storage means as discussed herein, and/or as known in the art at the time of filing, and/or as developed after the time of filing.

In one embodiment, the known/clean Icon image data is obtained from the known/clean file Icon database using a security system and/or one or more processors associated with one or more computing systems, such as user or security system provider computing systems.

In one embodiment, the known/clean .ico file data is obtained from the known/clean file Icon database using a security system and/or one or more processors associated with one or more computing systems, such as user or security system provider computing systems and, in one embodiment, clean/known Icon image data is obtained from the known/clean .ico file data using a security system and/or one or more processors associated with one or more computing systems, such as user or security system provider computing systems.

In one embodiment, the extracted relevant image data from the identified .ico files is analyzed and/or compared with known/clean Icon image data obtained from the known/clean file Icon database using a security system and/or one or more processors associated with one or more computing systems, such as user or security system provider computing systems.

In one embodiment, the provider of the method and apparatus for indentifying Icons and/or one or more users of the method and apparatus for indentifying Icons, define a threshold matching level such that if the extracted relevant image data from the identified .ico files matches with known/clean Icon image data obtained from the known/clean file Icon database to the at least the defined threshold match level, data indicating a status of the extracted .ico files, and/or given file/e-mail, is transformed to data indicating a status of Icon match.

In one embodiment, if the extracted relevant image data from the identified .ico files matches with known/clean Icon image data obtained from the known/clean file Icon database to a desired level of accuracy based on the defined threshold match level, data indicating a status of the extracted .ico files, and/or given file/e-mail, is transformed to data indicating a status of Icon match using a security system and/or one or more processors associated with one or more computing systems, such as user or security system provider computing systems.

In one embodiment, once the status of the extracted .ico files, and/or given file/e-mail, is transformed to data indicating a status of Icon match, the given file is subjected to further analysis deemed appropriate for a file that includes an Icon by the provider of the method and apparatus for indentifying Icons and/or one or more users of the method and apparatus for indentifying Icons.

Using the method and apparatus for indentifying Icons discussed herein, Icons can be effectively, efficiently, and more reliable identified by exploiting the fact that that virtually every PE file that includes an Icon has an associated .ico file in its resource section, and that the .ico file has a well defined format. In addition, using the method and apparatus for indentifying Icons, as discussed herein, fewer false positive results occur and the results are more reliable because most Icons are copyrighted. In addition, using the method and apparatus for indentifying Icons, as discussed herein, there is no need for the huge hashing databases required in the prior art. Consequently, using the method and apparatus for indentifying Icons discussed herein, Icons can be more reliable identified and therefore more malware disguised using Icons, particularly targeted and/or Trojan-based malware, can be detected and neutralized.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for identifying Icons, the fact that virtually every PE file that includes an Icon has an associated .ico file in its resource section, and that the .ico file has a well defined format, is used to identify Icons. In one embodiment, a known/clean file Icon database is created that includes .ico files and/or image files associated with known icons of selected applications such as, but not limited to: the Microsoft Word word processing program; the Microsoft Excel spreadsheet program; the Microsoft Paint graphics program; the Microsoft PowerPoint display program; the Microsoft Visio graphics program; JPEG; PDF; etc. In one embodiment, the resource section of any file being transferred to, or through, a given user computing system is stripped and scanned for .ico files. In one embodiment, any .ico files identified are extracted. In one embodiment, the directory count and image data is extracted from the identified .ico files. In one embodiment, the directory count extracted from the identified .ico files is used to determine the number of directories present in the .ico files. In one embodiment, for each directory of the directory count extracted from the identified .ico files, the relevant image data is extracted. In one embodiment, known/clean Icon image data is obtained from the known/clean file Icon database. In one embodiment, the extracted relevant image data from the identified .ico files is compared with the known/clean Icon image data obtained from the known/clean file Icon database. In one embodiment, if the extracted relevant image data from the identified .ico files matches with known/clean Icon image data obtained from the known/clean file Icon database to a desired level of accuracy, data indicating a status of the extracted .ico files, and/or given file/e-mail, is transformed to data indicating a status of Icon match and the file/e-mail is subjected to further analysis deemed appropriate for a file that includes an Icon.

Figure 1:
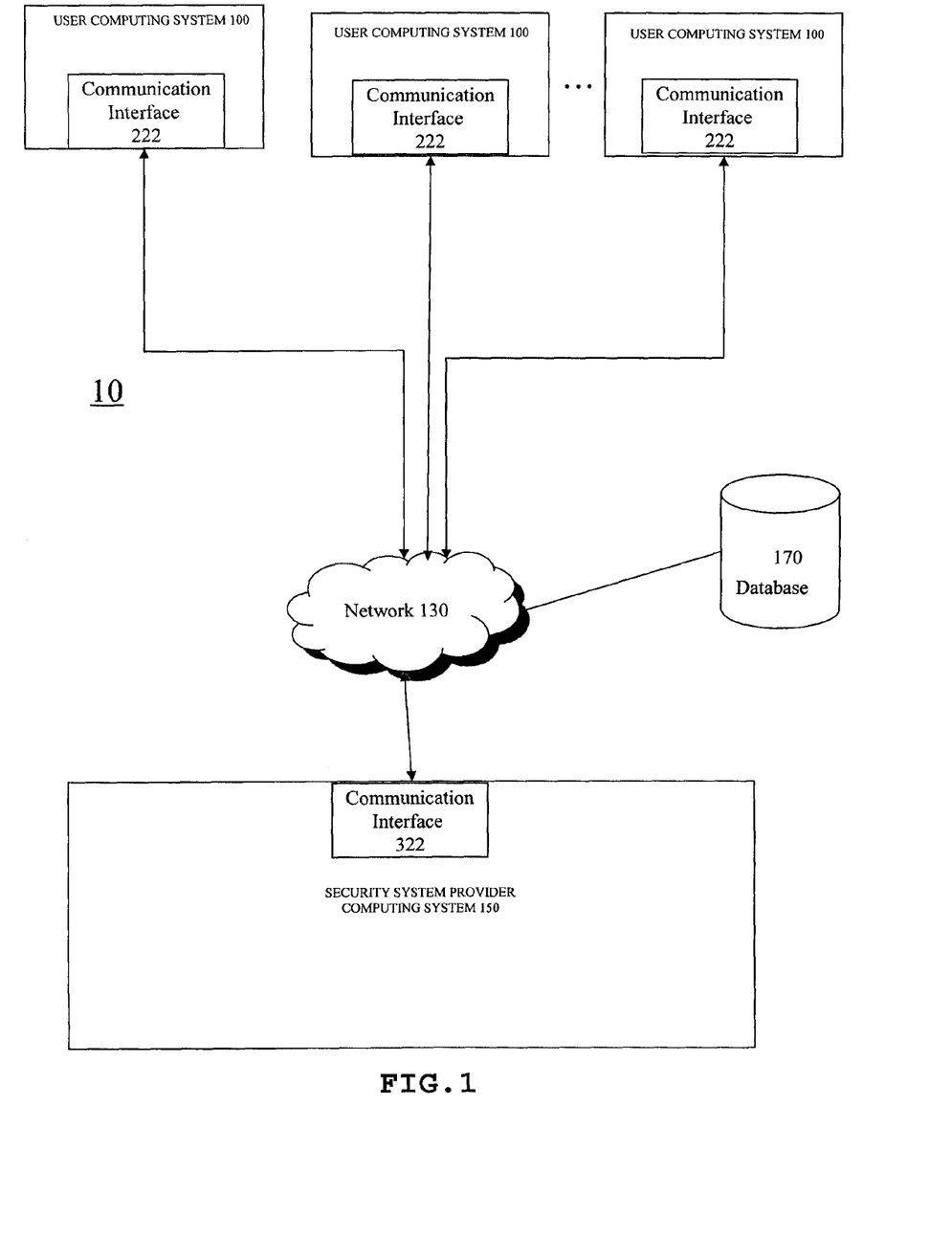
FIG. 1 is a block diagram of an exemplary hardware architecture for implementing one embodiment including user computing systems, a communication network, a database, and a security system provider computing system, in accordance with one embodiment.

FIG. 1 shows a block diagram of an exemplary hardware system 10 suitable for implementing one embodiment of a process for indentifying Icons, such as exemplary process 400 of FIG. 4 discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for indentifying Icons in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for indentifying Icons in accordance with at least one of the embodiments as described herein and is accessible by, controlled by, and/or otherwise associated with, a security system provider. As used herein, a security system provider includes, but is not limited to, any party, person, application, system, or entity that desires to identify and block malware and/or identify Icons.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. In one embodiment, database 170 is a known/clean file Icon database that includes .ico files and/or Icon image data associated with known icons of selected applications such as, but not limited to: the Microsoft Word word processing program; the Microsoft Excel spreadsheet program; the Microsoft Paint graphics program; the Microsoft PowerPoint display program; the Microsoft Visio graphics program; JPEG; PDF; etc. As discussed in more detail below, in one embodiment, database 170 is under the control of, or otherwise accessible by, a process for identifying Icons, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
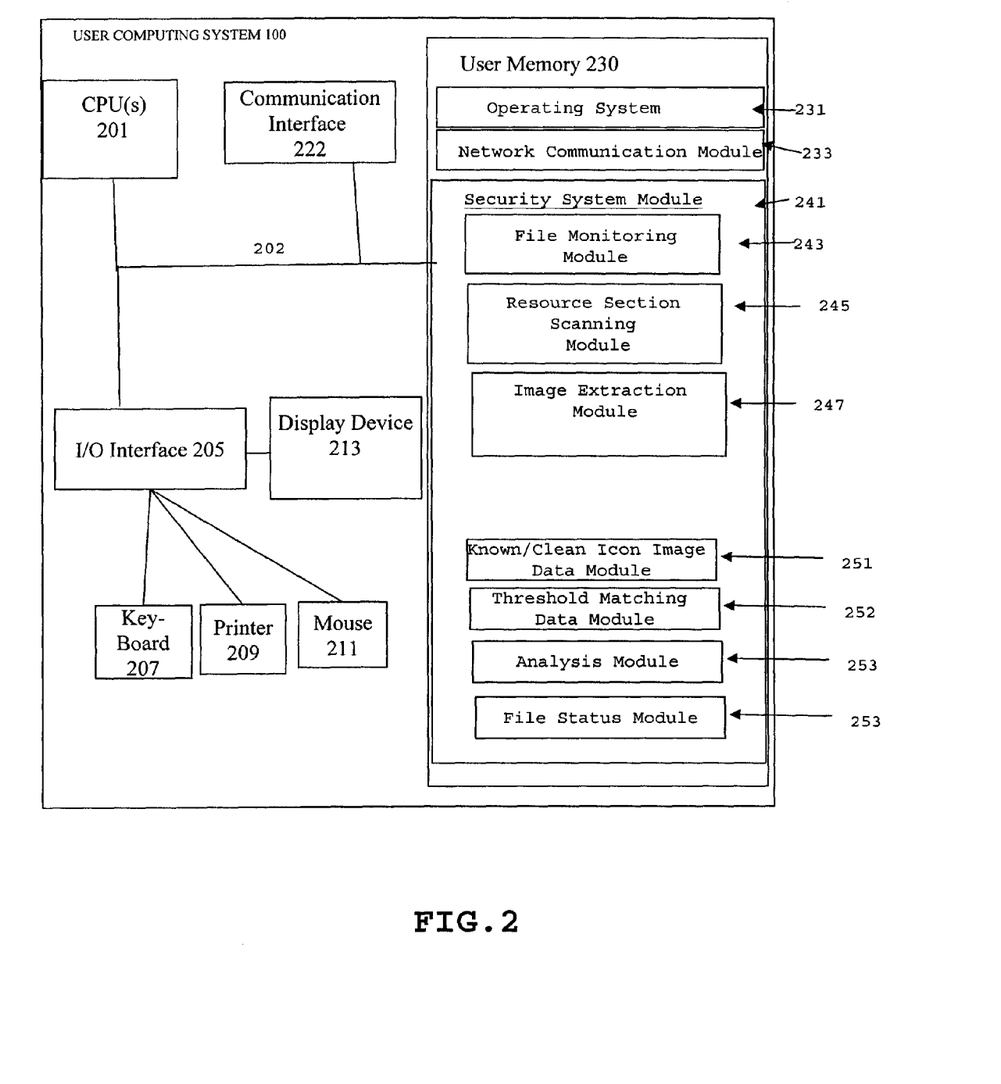
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing files directed to user computing system(s) 100 to identify Icons and/or block malware.

As also seen in FIG. 2, in one embodiment, security system module 241 of user memory 230 includes: file monitoring module 243 that includes procedures, data, and/or instructions for monitoring/scanning any files being transferred and/or otherwise sent to user computing system(s) 100 to identify Icons; resource section scanning module 245 that includes procedures, data, and/or instructions, for scanning the resource section of any file being transferred to, or through, user computing system(s) 100 for .ico files and/or stripping off any .ico files identified from the resource section; image extraction module 247 that includes procedures, data, and/or instructions, for extracting Icon image data; known/clean Icon image data module 251 that includes procedures, data, and/or instructions, for obtaining and storing corresponding known/clean Icon image data from a known/clean file Icon database; threshold matching data module 252 that includes procedures, data, and/or instructions, for obtaining and/or establishing a threshold matching level such that if the extracted relevant image data from the identified .ico files of image extraction module 247 matches with known/clean Icon image data obtained from the known/clean file Icon database of known/clean Icon image data module 251 to the at least the defined threshold match level, data indicating a status of the extracted .ico files, and/or given file/e-mail, is transformed to data indicating a status of Icon match; analysis module 253 that includes procedures, data, and/or instructions, for comparing the extracted relevant image data from the identified .ico files of image extraction module 247 and known/clean Icon image data obtained from the known/clean file Icon database of known/clean Icon image data module 251; and file status module 255 that includes procedures, data, and/or instructions, for transforming data indicating a status of the extracted .ico files, and/or given file/e-mail, to data indicating a status of Icon match if the extracted relevant image data from the identified .ico files of image extraction module 247 matches with known/clean Icon image data obtained from the known/clean file Icon database of known/clean Icon image data module 251 to the at least the defined threshold match level of threshold matching data module 252.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
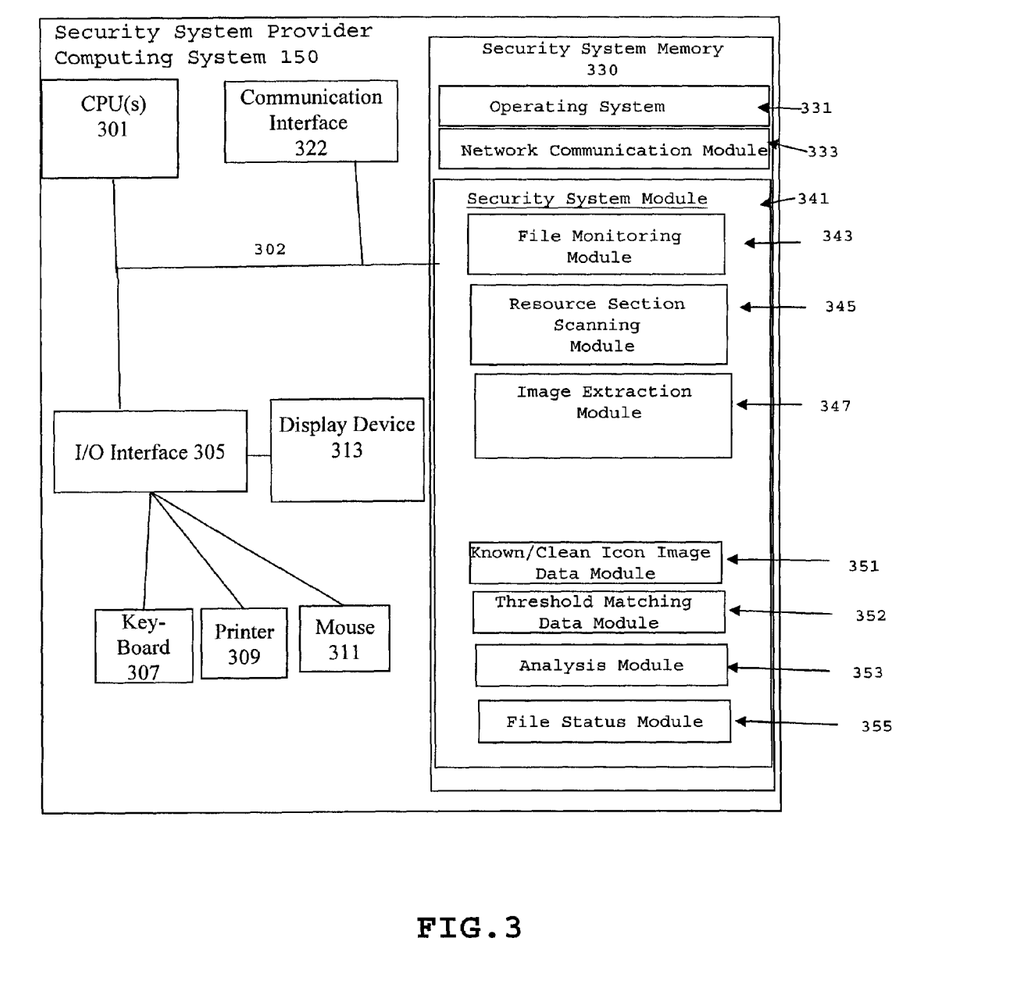
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and security system module 341 (FIG. 3) that includes procedures, data, and/or instructions, for intercepting and/or analyzing files directed to user computing system(s) 100 to identify Icon and/or block malware.

As also seen in FIG. 3, in one embodiment, security system module 341 of security system memory 330 includes: file monitoring module 343 that includes procedures, data, and/or instructions for monitoring/scanning any files being transferred and/or otherwise sent to user computing system(s) 100 to identify Icons; resource section scanning module 345 that includes procedures, data, and/or instructions, for scanning the resource section of any file being transferred to, or through, user computing system(s) 100 for .ico files and/or stripping off any .ico files identified from the resource section; image extraction module 347 that includes procedures, data, and/or instructions, for extracting Icon image data; known/clean Icon image data module 351 that includes procedures, data, and/or instructions, for obtaining and storing corresponding known/clean Icon image data from a known/clean file Icon database; threshold matching data module 352 that includes procedures, data, and/or instructions, for obtaining and/or establishing a threshold matching level such that if the extracted relevant image data from the identified .ico files of image extraction module 347 matches with known/clean Icon image data obtained from the known/clean file Icon database of known/clean Icon image data module 351 to the at least the defined threshold match level, data indicating a status of the extracted .ico files, and/or given file/e-mail, is transformed to data indicating a status of Icon match; analysis module 353 that includes procedures, data, and/or instructions, for comparing the extracted relevant image data from the identified .ico files of image extraction module 347 and known/clean Icon image data obtained from the known/clean file Icon database of known/clean Icon image data module 351; and file status module 355 that includes procedures, data, and/or instructions, for transforming data indicating a status of the extracted .ico files, and/or given file/e-mail, to data indicating a status of Icon match if the extracted relevant image data from the identified .ico files of image extraction module 347 matches with known/clean Icon image data obtained from the known/clean file Icon database of known/clean Icon image data module 351 to the at least the defined threshold match level of threshold matching data module 352.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Figure 4:
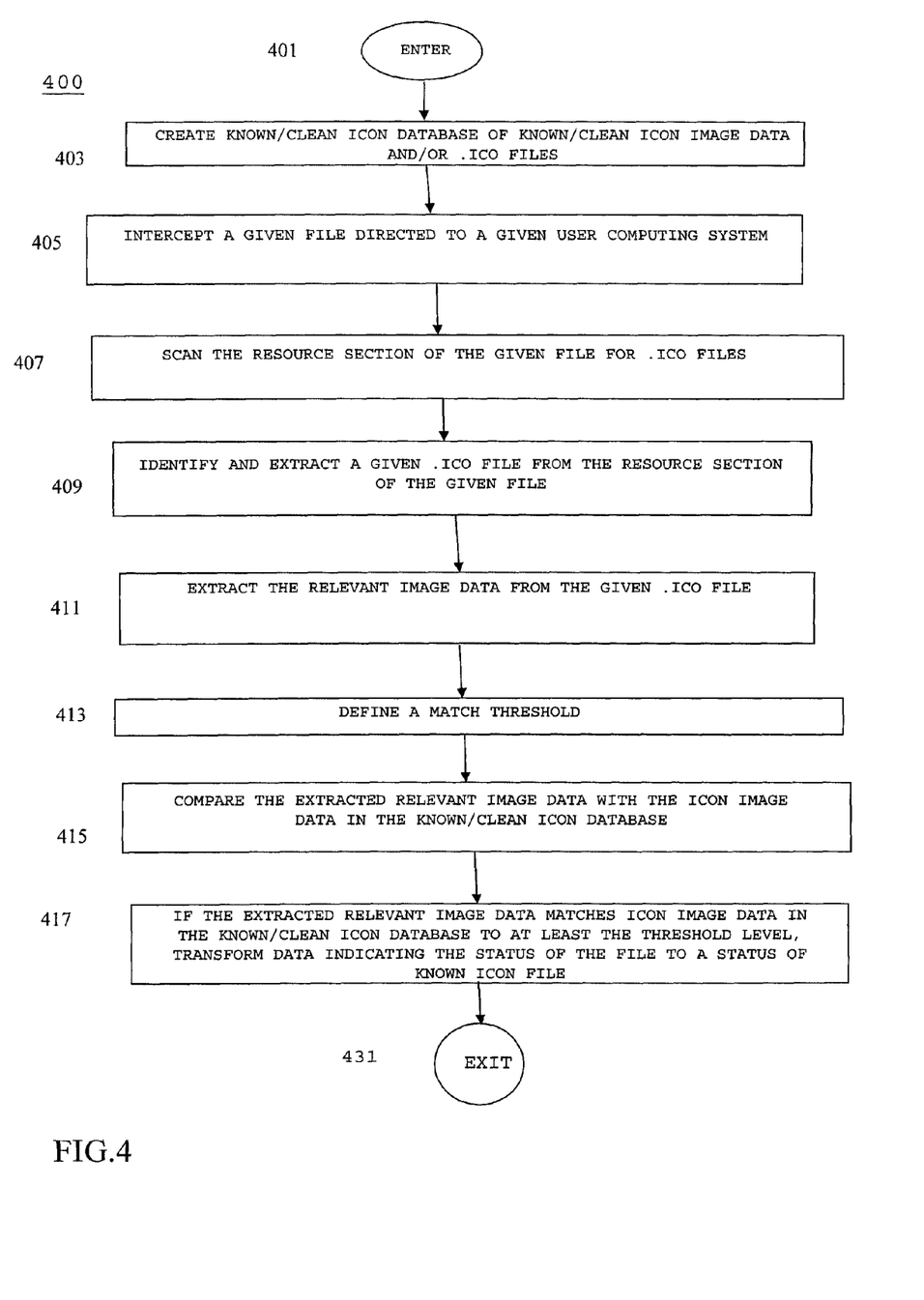
FIG. 4 is a flow chart depicting a process for indentifying Icons in accordance with one embodiment.

FIG. 4 is a flow chart depicting a process for indentifying Icons 400 in accordance with one embodiment.

Process for indentifying Icons 400 begins at ENTER OPERATION 401 and process flow proceeds to CREATE KNOWN/CLEAN ICON DATABASE OF KNOWN/CLEAN ICON IMAGE DATA AND/OR .ICO FILES OPERATION 403.

In one embodiment, at CREATE KNOWN/CLEAN ICON DATABASE OF KNOWN/CLEAN ICON IMAGE DATA AND/OR .ICO FILES OPERATION 403 a known/clean file Icon database is created that includes .ico files associated with known icons of selected applications.

In one embodiment, at CREATE KNOWN/CLEAN ICON DATABASE OF KNOWN/CLEAN ICON IMAGE DATA AND/OR .ICO FILES OPERATION 403 a known/clean file Icon database is created that includes Icon image data associated with known icons of selected applications.

In one embodiment, at CREATE KNOWN/CLEAN ICON DATABASE OF KNOWN/CLEAN ICON IMAGE DATA AND/OR .ICO FILES OPERATION 403 a known/clean file Icon database is created that includes .ico files associated with known icons of selected applications and Icon image data associated with known icons of selected applications.

In one embodiment, at CREATE KNOWN/CLEAN ICON DATABASE OF KNOWN/CLEAN ICON IMAGE DATA AND/OR .ICO FILES OPERATION 403 a known/clean file Icon database is created that includes Icon image data and/or .ico files associated with known icons of selected applications such as, but not limited to: the Microsoft Word word processing program; the Microsoft Excel spreadsheet program; the Microsoft Paint graphics program; the Microsoft PowerPoint display program; the Microsoft Visio graphics program; JPEG; PDF; or any other .ico files associated with known icons desired by the provider of process for identifying Icons 400, and/or one or more users of process for identifying Icons 400, and/or as discussed herein, and/or as known in the art at the time of filing, and/or as developed after the time of filing.

As noted above, the .ico file format is an image file format used for icons in the Microsoft Windows operating system. Typically .ico files contain one or more small images at multiple sizes and color depths. The official LANA registered MIME type for ico files is image/vnd.microsoft.icon.

As also noted above, the file structure for .ico files is as follows, with all values represented in little-endian (Intel standard) format.

| Icon #1 | The actual "data" for the first image in old AND/XOR DIB format or newer PNG |
| --- | --- |
| ... | |
| Icon #n | Data for the last icon image |

| Offset# | Size | Purpose |
| --- | --- | --- |
| Header | | |
| 0 | 2 | reserved. should always be 0 |
| 2 | 2 | type. 1 for icon (.ICO), 2 for cursor (.CUR) file |
| 4 | 2 | count; number of images in the file |
| Directory | | |
| 0 | 1 | width, should be 0 if 256 pixels |
| 1 | 1 | height, should be 0 if 256 pixels |
| 2 | 1 | color count, should be 0 if more than 256 colors |
| 3 | 1 | reserved, should be 0 |
| 4 | 2 | color planes when in .ICO format, should be 0 or 1, or the X hotspot when in .CUR format |
| 6 | 2 | bits per pixel when in .ICO format, or the Y hotspot when in .CUR format |
| 8 | 4 | size in bytes of the bitmap data |
| 12 | 4 | offset, bitmap data address in the file |

As also noted above, in one embodiment, the fact that virtually every file/e-mail that includes an Icon has an associated .ico file in its resource section, and that the .ico file has a well defined format, as shown above, is used to identify Icons.

In one embodiment, the known/clean file Icon database of CREATE KNOWN/CLEAN ICON DATABASE OF KNOWN/CLEAN ICON IMAGE DATA AND/OR .ICO FILES OPERATION 403 is a database such as database 170 of FIG. 1.

Returning to FIG. 4, in one embodiment, the known/clean file Icon database of CREATE KNOWN/CLEAN ICON DATABASE OF KNOWN/CLEAN ICON IMAGE DATA AND/OR .ICO FILES OPERATION 403 is a data storage device, a designated server system or computing system, or a designated portion of one or more server systems or computing systems, and/or security system provider computing systems, or a distributed database, or an external and/or portable hard drive.

In one embodiment, the known/clean file Icon database of CREATE KNOWN/CLEAN ICON DATABASE OF KNOWN/CLEAN ICON IMAGE DATA AND/OR .ICO FILES OPERATION 403 is a dedicated mass storage device implemented in software, hardware, or a combination of hardware and software.

In one embodiment, the known/clean file Icon database of CREATE KNOWN/CLEAN ICON DATABASE OF KNOWN/CLEAN ICON IMAGE DATA AND/OR .ICO FILES OPERATION 403 is a web-based function.

As discussed in more detail below, in one embodiment, the known/clean file Icon database is under the control of, or otherwise accessible by, process for identifying Icons 400, and/or a provider of a security system and/or a security system provider computing system, such as security system provider computing system 150 of FIGS. 1 and 3. In one embodiment, the known/clean file Icon database is part of a cloud computing environment.

Returning to FIG. 4, in one embodiment, once a known/clean file Icon database is created that includes Icon image data and/or .ico files associated with known icons of selected applications at CREATE KNOWN/CLEAN ICON DATABASE OF KNOWN/CLEAN ICON IMAGE DATA AND/OR .ICO FILES OPERATION 403, process flow proceeds to INTERCEPT A GIVEN FILE DIRECTED TO A GIVEN USER COMPUTING SYSTEM OPERATION 405.

In one embodiment, at INTERCEPT A GIVEN FILE DIRECTED TO A GIVEN USER COMPUTING SYSTEM OPERATION 405 any file and/or e-mail being transferred to, or through, a given user computing system, such as user computing systems 100 of FIGS. 1 and 2, is intercepted by a security system, such as security system modules 241 and/or 341 of FIGS. 2 and 3, residing locally on a user computing system, such as user computing systems 100 of FIGS. 1 and 2, and/or remotely from the given user computing system on a security system provider computing system, such as security system provider computing system 150 of FIGS. 1 and 3.

Returning to FIG. 4, in one embodiment, at INTERCEPT A GIVEN FILE DIRECTED TO A GIVEN USER COMPUTING SYSTEM OPERATION 405 the given user computing system is monitored/scanned for all incoming files/e-mails.

In one embodiment, at INTERCEPT A GIVEN FILE DIRECTED TO A GIVEN USER COMPUTING SYSTEM OPERATION 405 at least part of process for indentifying Icons 400 is implemented by one or more processors, such as CPUs 201 of FIG. 2, associated a user computing system, such as user computing system 100 of FIGS. 1 and 2, and the given user computing system is monitored/scanned using a file monitoring module, such as file monitoring module 243, of security system module 241, of user memory 230, of user computing system 100 of FIG. 2.

Returning to FIG. 3, in one embodiment, at INTERCEPT A GIVEN FILE DIRECTED TO A GIVEN USER COMPUTING SYSTEM OPERATION 405 at least part of the process for indentifying Icons 400 is implemented by one or more processors, such as CPUs 301 of FIG. 3 associated with a security system provider computing system and the given user computing system is monitored/scanned using a file monitoring module, such as file monitoring module 343, of security system module 341, of security system memory 330, of security system provider computing system 150 of FIG. 3.

Returning to FIG. 3, in one embodiment, at INTERCEPT A GIVEN FILE DIRECTED TO A GIVEN USER COMPUTING SYSTEM OPERATION 405 the given user computing system is monitored/scanned using any one of numerous methods for locally and/or remotely monitoring a computing system as discussed herein, and/or as known in the art at the time of filing, and/or as developed after the time filing.

In one embodiment, once any file and/or e-mail being transferred to, or through, a given user computing system, such as user computing systems 100 of FIGS. 1 and 2, is intercepted by a security system, such as security system modules 241 and/or 341 of FIGS. 2 and 3, residing locally on a user computing system, such as user computing systems 100 of FIGS. 1 and 2, and/or remotely from the given user computing system on a security system provider computing system, such as security system provider computing system 150 of FIGS. 1 and 3, at INTERCEPT A GIVEN FILE DIRECTED TO A GIVEN USER COMPUTING SYSTEM OPERATION 405, process flow proceeds to SCAN THE RESOURCE SECTION OF THE GIVEN FILE FOR .ICO FILES OPERATION 407.

In one embodiment, at SCAN THE RESOURCE SECTION OF THE GIVEN FILE FOR .ICO FILES OPERATION 407 the resource section of the intercepted files/e-mails being transferred to, or through, the given user computing system of INTERCEPT A GIVEN FILE DIRECTED TO A GIVEN USER COMPUTING SYSTEM OPERATION 405 is stripped and scanned for .ico files.

In one embodiment, at SCAN THE RESOURCE SECTION OF THE GIVEN FILE FOR .ICO FILES OPERATION 407 the resource section of any file/e-mail being transferred to, or through, the given user computing system is stripped and scanned for .ico files using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

As noted above, herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, once the resource section of the intercepted files/e-mails being transferred to, or through, the given user computing system of INTERCEPT A GIVEN FILE DIRECTED TO A GIVEN USER COMPUTING SYSTEM OPERATION 405 is stripped and scanned for .ico files at SCAN THE RESOURCE SECTION OF THE GIVEN FILE FOR .ICO FILES OPERATION 407, process flow proceeds to IDENTIFY AND EXTRACT A GIVEN .ICO FILE FROM THE RESOURCE SECTION OF THE GIVEN FILE OPERATION 409.

In one embodiment, at IDENTIFY AND EXTRACT A GIVEN .ICO FILE FROM THE RESOURCE SECTION OF THE GIVEN FILE OPERATION 409 any .ico files identified at SCAN THE RESOURCE SECTION OF THE GIVEN FILE FOR .ICO FILES OPERATION 407 are extracted.

In one embodiment, at IDENTIFY AND EXTRACT A GIVEN .ICO FILE FROM THE RESOURCE SECTION OF THE GIVEN FILE OPERATION 409 any .ico files identified at SCAN THE RESOURCE SECTION OF THE GIVEN FILE FOR .ICO FILES OPERATION 407 are extracted using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

As also noted above, the standard .ico file format includes: Icon File Format (little Endean); Icon Header, for storing general information about the .ico file; a Directory (1 through n) for storing general information about every image 1 through n in the file; and an Icon #n, i.e., the actual image data associated with the "nth" Icon image, in "old" AND/XOR DIB format or the "new" PNG format.

In one embodiment, at IDENTIFY AND EXTRACT A GIVEN .ICO FILE FROM THE RESOURCE SECTION OF THE GIVEN FILE OPERATION 409 the directory count data is extracted from the Directory (1 through n) in the file of the identified given .ico file using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

Returning to FIG. 4, in one embodiment, at IDENTIFY AND EXTRACT A GIVEN .ICO FILE FROM THE RESOURCE SECTION OF THE GIVEN FILE OPERATION 409 the directory count extracted from the identified given .ico file is analyzed using a security system and/or one or more processors associated with one or more computing systems, such as user or security system provider computing systems to determine the number of directories present in the given .ico file.

Returning to FIG. 4, in one embodiment, at IDENTIFY AND EXTRACT A GIVEN .ICO FILE FROM THE RESOURCE SECTION OF THE GIVEN FILE OPERATION 409 the image data is extracted from the Icon #n, i.e., the actual image data associated with the "nth" Icon image of the identified given .ico file using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

In one embodiment, once any .ico files identified at SCAN THE RESOURCE SECTION OF THE GIVEN FILE FOR .ICO FILES OPERATION 407 are extracted using a security system, and/or one or more processors associated with one or more computing systems at IDENTIFY AND EXTRACT A GIVEN .ICO FILE FROM THE RESOURCE SECTION OF THE GIVEN FILE OPERATION 409, process flow proceeds to EXTRACT THE RELEVANT IMAGE DATA FROM THE GIVEN .ICO FILE OPERATION 411.

In one embodiment, at EXTRACT THE RELEVANT IMAGE DATA FROM THE GIVEN .ICO FILE OPERATION 411 for each directory of the directory count extracted from the identified .ico files, the relevant image data is extracted.

In one embodiment, at EXTRACT THE RELEVANT IMAGE DATA FROM THE GIVEN .ICO FILE OPERATION 411, for each directory of the directory count extracted from the identified .ico files, the relevant image data is extracted from the Icon #n, i.e., the actual image data associated with the "nth" Icon image of the identified given .ico file of IDENTIFY AND EXTRACT A GIVEN .ICO FILE FROM THE RESOURCE SECTION OF THE GIVEN FILE OPERATION 409.

In one embodiment, once for each directory of the directory count extracted from the identified .ico files, the relevant image data is extracted at EXTRACT THE RELEVANT IMAGE DATA FROM THE GIVEN .ICO FILE OPERATION 411 process flow proceeds to DEFINE A MATCH THRESHOLD OPERATION 413.

In one embodiment, at DEFINE A MATCH THRESHOLD OPERATION 413 the provider of process for indentifying Icons 400, and/or one or more users of process for indentifying Icons 400, define a threshold matching level such that if the extracted relevant image data of EXTRACT THE RELEVANT IMAGE DATA FROM THE GIVEN .ICO FILE OPERATION 411 from the identified given .ico file of IDENTIFY AND EXTRACT A GIVEN .ICO FILE FROM THE RESOURCE SECTION OF THE GIVEN FILE OPERATION 409 matches with known/clean Icon image data. obtained from the known/clean file Icon database of CREATE KNOWN/CLEAN ICON DATABASE OF KNOWN/CLEAN ICON IMAGE DATA AND/OR .ICO FILES OPERATION 403 to the at least the defined threshold match level, data indicating a status of the extracted .ico files, and/or given file/e-mail, is transformed to data indicating a status of Icon match.

In various embodiments, the threshold match level is defined at DEFINE A MATCH THRESHOLD OPERATION 413 to be a defined percentage match, such as 50%, 75%, etc. In various embodiments, the threshold match level is defined at DEFINE A MATCH THRESHOLD OPERATION 413 to be a minimum threshold match. In various embodiments, the threshold match level is defined at DEFINE A MATCH THRESHOLD OPERATION 413 to be any threshold desired by the provider of process for indentifying Icons 400, and/or one or more users of process for indentifying Icons 400.

In one embodiment, once the provider of process for indentifying Icons 400, and/or one or more users of process for indentifying Icons 400, define a threshold matching level such that if the extracted relevant image data of EXTRACT THE RELEVANT IMAGE DATA FROM THE GIVEN .ICO FILE OPERATION 411 from the identified given .ico file of IDENTIFY AND EXTRACT A GIVEN .ICO FILE FROM THE RESOURCE SECTION OF THE GIVEN FILE OPERATION 409 matches with known/clean Icon image data obtained from the known/clean file Icon database of CREATE KNOWN/CLEAN ICON DATABASE OF KNOWN/CLEAN ICON IMAGE DATA AND/OR .ICO FILES OPERATION 403 to the at least the defined threshold match level, data indicating a status of the extracted .ico files, and/or given file/e-mail, is transformed to data indicating a status of Icon match once at DEFINE A MATCH THRESHOLD OPERATION 413, process flow proceeds to COMPARE THE EXTRACTED RELEVANT IMAGE DATA WITH THE ICON IMAGE DATA IN THE KNOWN/CLEAN ICON DATABASE OPERATION 415.

In one embodiment, at COMPARE THE EXTRACTED RELEVANT IMAGE DATA WITH THE ICON IMAGE DATA IN THE KNOWN/CLEAN ICON DATABASE OPERATION 415 known/clean Icon image data obtained from the known/clean file Icon database of CREATE KNOWN/CLEAN ICON DATABASE OF KNOWN/CLEAN ICON IMAGE DATA AND/OR .ICO FILES OPERATION 403 and/or the extracted image data from the given .ico file of EXTRACT THE RELEVANT IMAGE DATA FROM THE GIVEN .ICO FILE OPERATION 411 is compared.

In one embodiment, at COMPARE THE EXTRACTED RELEVANT IMAGE DATA WITH THE ICON IMAGE DATA IN THE KNOWN/CLEAN ICON DATABASE OPERATION 415 the extracted relevant image data from the given .ico file of EXTRACT THE RELEVANT IMAGE DATA FROM THE GIVEN .ICO FILE OPERATION 411 is compared with known/clean Icon image data obtained from the known/clean file Icon database on a byte-by-byte basis.

In one embodiment, at COMPARE THE EXTRACTED RELEVANT IMAGE DATA WITH THE ICON IMAGE DATA IN THE KNOWN/CLEAN ICON DATABASE OPERATION 415 the known/clean Icon image data is obtained from the known/clean file Icon database using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3 and/or one or more processors, such as CPU(s) 201 and/or 301, associated with one or more computing systems, such as user computing system 100 of FIG. 2 and/or security system provider computing system 150 of FIG. 3.

Returning to FIG. 4, in one embodiment, at COMPARE THE EXTRACTED RELEVANT IMAGE DATA WITH THE ICON IMAGE DATA IN THE KNOWN/CLEAN ICON DATABASE OPERATION 415 the clean/known Icon image data is obtained from the known/clean .ico file data of the known/clean file Icon database using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

Returning to FIG. 4, in one embodiment, at COMPARE THE EXTRACTED RELEVANT IMAGE DATA WITH THE ICON IMAGE DATA IN THE KNOWN/CLEAN ICON DATABASE OPERATION 415 the extracted relevant image data from the identified .ico files is analyzed and/or compared with known/clean Icon image data obtained from the known/clean file Icon database using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

In one embodiment, once known/clean Icon image data is obtained from the known/clean file Icon database of CREATE KNOWN/CLEAN ICON DATABASE OF KNOWN/CLEAN ICON IMAGE DATA AND/OR .ICO FILES OPERATION 403 and the extracted relevant image data from the given .ico file of EXTRACT THE RELEVANT IMAGE DATA FROM THE GIVEN .ICO FILE OPERATION 411 is compared with known/clean Icon image data obtained from the known/clean file Icon database at COMPARE THE EXTRACTED RELEVANT IMAGE DATA WITH THE ICON IMAGE DATA IN THE KNOWN/CLEAN ICON DATABASE OPERATION 415, process flow proceeds to IF THE EXTRACTED RELEVANT IMAGE DATA MATCHES ONE OR MORE OF THE .ICO FILES IN THE KNOWN/CLEAN ICON DATABASE TO AT LEAST THE THRESHOLD LEVEL, TRANSFORM DATA INDICATING THE STATUS OF THE FILE TO A STATUS OF KNOWN ICON FILE OPERATION 417.

In one embodiment, at IF THE EXTRACTED RELEVANT IMAGE DATA MATCHES ONE OR MORE OF THE .ICO FILES IN THE KNOWN/CLEAN ICON DATABASE TO AT LEAST THE THRESHOLD LEVEL, TRANSFORM DATA INDICATING THE STATUS OF THE FILE TO A STATUS OF KNOWN ICON FILE OPERATION 417 if the extracted relevant image data of EXTRACT THE RELEVANT IMAGE DATA FROM THE GIVEN .ICO FILE OPERATION 411 from the identified given .ico file of IDENTIFY AND EXTRACT A GIVEN .ICO FILE FROM THE RESOURCE SECTION OF THE GIVEN FILE OPERATION 409 matches with the known/clean Icon image data obtained from the known/clean file Icon database of CREATE KNOWN/CLEAN ICON DATABASE OF KNOWN/CLEAN ICON IMAGE DATA AND/OR .ICO FILES OPERATION 403 to the defined threshold match level of DEFINE A MATCH THRESHOLD OPERATION 413 at COMPARE THE EXTRACTED RELEVANT IMAGE DATA WITH THE ICON IMAGE DATA IN THE KNOWN/CLEAN ICON DATABASE OPERATION 415, then data indicating a status of the extracted .ico files, and/or given file/e-mail/e-mail of INTERCEPT A GIVEN FILE DIRECTED TO A GIVEN USER COMPUTING SYSTEM OPERATION 405, is transformed to data indicating a status of Icon match and, in one embodiment, the file/e-mail is subjected to further analysis deemed appropriate for a file/e-mail that includes an Icon.

In one embodiment, at IF THE EXTRACTED RELEVANT IMAGE DATA MATCHES ONE OR MORE OF THE .ICO FILES IN THE KNOWN/CLEAN ICON DATABASE TO AT LEAST THE THRESHOLD LEVEL, TRANSFORM DATA INDICATING THE STATUS OF THE FILE TO A STATUS OF KNOWN ICON FILE OPERATION 417, if the extracted relevant image data from the identified .ico files matches with known/clean Icon image data obtained from the known/clean file Icon database to a desired level of accuracy based on the defined threshold match level, data indicating a status of the extracted .ico files, and/or given file/e-mail, is transformed to data indicating a status of Icon match using a security system, such as security system module 241 of user computing system 100 of FIG. 2 and/or security system module 341 of security system provider computing system 150 of FIG. 3, and/or one or more processors, such as CPU(s) 201 and/or 301, associated with one or more computing systems, such as user computing system 100 of FIG. 2 and/or security system provider computing system 150 of FIG. 3.

Returning to FIG. 4, in one embodiment, once the status of the extracted .ico files, and/or given file/e-mail/e-mail, is transformed to data indicating a status of Icon match, the given file is subjected to further analysis deemed appropriate for a file that includes an Icon by the provider of the method and apparatus for indentifying Icons and/or one or more users of the method and apparatus for indentifying Icons.

In one embodiment, once the extracted relevant image data of EXTRACT THE RELEVANT IMAGE DATA FROM THE GIVEN .ICO FILE OPERATION 411 from the identified given .ico file of IDENTIFY AND EXTRACT A GIVEN .ICO FILE FROM THE RESOURCE SECTION OF THE GIVEN FILE OPERATION 409 matches with the known/clean Icon image data obtained from the known/clean file Icon database of CREATE KNOWN/CLEAN ICON DATABASE OF KNOWN/CLEAN ICON IMAGE DATA AND/OR .ICO FILES OPERATION 403 to the defined threshold match level of DEFINE A MATCH THRESHOLD OPERATION 413 at COMPARE THE EXTRACTED RELEVANT IMAGE DATA WITH THE ICON IMAGE DATA IN THE KNOWN/CLEAN ICON DATABASE OPERATION 415, and data indicating a status of the extracted .ico files, and/or given file/e-mail/e-mail of INTERCEPT A GIVEN FILE DIRECTED TO A GIVEN USER COMPUTING SYSTEM OPERATION 405, is transformed to data indicating a status of Icon match at IF THE EXTRACTED RELEVANT IMAGE DATA MATCHES ONE OR MORE OF THE .ICO FILES IN THE KNOWN/CLEAN ICON DATABASE TO AT LEAST THE THRESHOLD LEVEL, TRANSFORM DATA INDICATING THE STATUS OF THE FILE TO A STATUS OF KNOWN ICON FILE OPERATION 417, process flow proceeds to EXIT OPERATION 431. In one embodiment, at EXIT OPERATION 431 process for indentifying Icons 400 is exited to await new data.

Using process for indentifying Icons 400, Icons can be effectively, efficiently, and more reliable identified by exploiting the fact that that virtually every PE file that includes an Icon has an associated .ico file in its resource section, and that the .ico file has a well defined format. In addition, using process for indentifying Icons 400, fewer false positive results occur and the results are more reliable because most Icons are copyrighted. In addition, process for indentifying Icons 400, there is no need for the huge hashing databases required in the prior art. Consequently, using process for indentifying Icons 400, Icons can be more reliable identified and therefore more malware disguised using Icons, particularly targeted and/or Trojan-based malware, can be detected and neutralized.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed.

Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "detecting", "analyzing", "storing", "saving", "classifying", "comparing", "determining", "processing", "creating", "preventing", "quarantining" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for identifying Icons comprising:
providing a known/clean file Icon database, the known/clean file Icon database including Icon image data associated with one or more Icons associated with one or more applications;
using one or more processors associated with one or more computing systems to monitor a given user computing system to detect and intercept all PE files being directed to the given user computing system;
using one or more processors associated with one or more computing systems to scan the resource section of all PE files being directed to the given user computing system to detect .ico files;
detecting a given .ico file in the resource section of a given PE file;
extracting the given .ico file from the resource section of a given PE file using one or more processors associated with one or more computing systems;
extracting relevant image data from the given .ico file;
obtaining known/clean Icon image data from the known/clean file Icon database;

defining a threshold matching level such that if the extracted relevant image data from the given .ico file matches with known/clean Icon image data obtained from the known/clean file Icon database to at least the defined threshold match level, data indicating a status of the extracted .ico file and the given file, is transformed to data indicating a status of Icon match;

comparing the relevant image data from the given .ico file and clean/known Icon image data from the known/clean file Icon database; and if the extracted relevant image data from the given .ico file matches with known/clean Icon image data obtained from the known/clean file Icon database to at least the defined threshold match level, transforming data indicating a status of the extracted .ico file and the given PE file, to data indicating a status of Icon match.

2. The computing system implemented process for identifying Icons of claim 1, wherein:
at least one of the one or more Icons associated with one or more applications is selected from the group of Icons consisting of:
the Microsoft Word word processing program;
the Microsoft Excel spreadsheet program;
the Microsoft Paint graphics program;
the Microsoft PowerPoint display program;
the Microsoft Visio graphics program;
JPEG; and
PDF.

3. The computing system implemented process for identifying Icons of claim 1, wherein:
the threshold matching level is defined such that if the extracted relevant image data from the given .ico file matches with known/clean Icon image data obtained from the known/clean file Icon database to a fifty percent match level, data indicating a status of the extracted .ico file and the given PE file, is transformed to data indicating a status of Icon match.

4. The computing system implemented process for identifying Icons of claim 1, wherein:
comparing the relevant image data from the given .ico file and clean/known Icon image data from the known/clean file Icon database is performed on a byte-by-byte basis.

5. The computing system implemented process for identifying Icons of claim 1, further comprising:
taking one or more actions to protect a user of the given user computing system if the extracted relevant image data from the given .ico file matches with known/clean Icon image data obtained from the known/clean file Icon database to at least the defined threshold match level.

6. The computing system implemented process for identifying Icons of claim 5, wherein:
at least one of the one or more actions taken to protect a user of the given user computing system is selected from the group of protective actions consisting of:
quarantining the given PE file;
performing further analysis of the given PE file;
blocking the given PE file; and
generating a warning to the user regarding the given PE file.

7. A system for identifying Icons comprising:
a known/clean file Icon database, the known/clean file Icon database including Icon image data associated with one or more Icons associated with one or more applications;
a given user computing system;
a security system associated with the given user computing system;
a security system provider computing system;
one or more processors associated with the security system provider computing system, the one or more processors associated with the security system provider computing system executing at least part of a computing system implemented process for identifying Icons, the computing system implemented process for identifying Icons comprising:

using the one or more processors associated with the security system provider computing system to monitor a given user computing system to detect and intercept all files being directed to the given user computing system;

using the one or more processors associated with the security system provider computing system to scan the resource section of all files being directed to the given user computing system to detect .ico files;

detecting a given .ico file in the resource section of a given file;

extracting the given .ico file from the resource section of a given file using the one or more processors associated with the security system provider computing system;

extracting relevant image data from the given .ico file using the one or more processors associated with the security system provider computing system;

obtaining known/clean Icon image data from the known/clean file Icon database;

defining a threshold matching level such that if the extracted relevant image data from the given .ico file matches with known/clean Icon image data obtained from the known/clean file Icon database to at least the defined threshold match level, data indicating a status of the extracted .ico file and the given file, is transformed to data indicating a status of Icon match;

comparing the relevant image data from the given .ico file and clean/known Icon image data from the known/clean file Icon database using the one or more processors associated with the security system provider computing system; and if the extracted relevant image data from the given .ico file matches with known/clean Icon image data obtained from the known/clean file Icon database to at least the defined threshold match level, transforming data indicating a status of the extracted .ico file and the given file, to data indicating a status of Icon match using the one or more processors associated with the security system provider computing system.

8. The system for identifying Icons of claim 7, wherein:
the given file is a PE file.

9. The system for identifying Icons of claim 7, wherein:
at least one of the one or more Icons associated with one or more applications is selected from the group of Icons consisting of:
the Microsoft Word word processing program;
the Microsoft Excel spreadsheet program;
the Microsoft Paint graphics program;
the Microsoft PowerPoint display program;
the Microsoft Visio graphics program;
JPEG; and
PDF.

10. The system for identifying Icons of claim 7, wherein:
the threshold matching level is defined such that if the extracted relevant image data from the given .ico file matches with known/clean Icon image data obtained from the known/clean file Icon database to a fifty percent match level, data indicating a status of the extracted .ico file and the given file, is transformed to data indicating a status of Icon match.

11. The system for identifying Icons of claim 7, wherein:
comparing the relevant image data from the given .ico file and clean/known Icon image data from the known/clean file Icon database is performed on a byte-by-byte basis.

12. The system for identifying Icons of claim 7, further comprising:
taking one or more actions to protect a user of the given user computing system if the extracted relevant image data from the given .ico file matches with known/clean Icon image data obtained from the known/clean file Icon database to at least the defined threshold match level.

13. The system for identifying Icons of claim 12, wherein:
at least one of the one or more actions taken to protect a user of the given user computing system is selected from the group of protective actions consisting of:
quarantining the given file;
performing further analysis of the given file;
blocking the given file; and
generating a warning to the user regarding the given file.

14. A system for identifying Icons comprising:
a known/clean file Icon database, the known/clean file Icon database including Icon image data associated with one or more Icons associated with one or more applications;
a given user computing system;
a security system associated with the given user computing system;
one or more processors associated with the given user computing system, the one or more processors associated with the given user computing system executing at least part of a computing system implemented process for identifying Icons, the computing system implemented process for identifying Icons comprising:
using the one or more processors associated with the given user computing system to monitor the given user computing system to detect and intercept all files being directed to the given user computing system;
using the one or more processors associated with the given user computing system to scan the resource section of all files being directed to the given user computing system to detect .ico files;
detecting a given .ico file in the resource section of a given file;
extracting the given .ico file from the resource section of a given file using the one or more processors associated with the given user computing system;
extracting relevant image data from the given .ico file using the one or more processors associated with the given user computing system;
obtaining clean/known Icon image data from the known/clean file Icon database;
defining a threshold matching level such that if the extracted relevant image data from the given .ico file matches with known/clean Icon image data obtained from the known/clean file Icon database to at least the defined threshold match level, data indicating a status of the extracted .ico file and the given file, is transformed to data indicating a status of Icon match;
comparing the relevant image data from the given .ico file and clean/known Icon image data from the known/clean file Icon database using the one or more processors associated with the given user computing system; and
if the extracted relevant image data from the given .ico file matches with known/clean Icon image data obtained from the known/clean file Icon database to at least the defined threshold match level, transforming data indicating a status of the extracted .ico file and the given file, to data indicating a status of Icon match using the one or more processors associated with the given user computing system.

15. The system for identifying Icons of claim 14, wherein:
the given file is a PE file.

16. The system for identifying Icons of claim 14, wherein:
at least one of the one or more Icons associated with one or more applications is selected from the group of Icons consisting of:
the Microsoft Word word processing program;
the Microsoft Excel spreadsheet program;
the Microsoft Paint graphics program;
the Microsoft PowerPoint display program;
the Microsoft Visio graphics program;
JPEG; and
PDF.

17. The system for identifying Icons of claim 14, wherein:
the threshold matching level is defined such that if the extracted relevant image data from the given .ico file matches with known/clean Icon image data obtained from the known/clean file Icon database to a fifty percent match level, data indicating a status of the extracted .ico file and the given file, is transformed to data indicating a status of Icon match.

18. The system for identifying Icons of claim 14, wherein:
comparing the relevant image data from the given .ico file and clean/known Icon image data from the known/clean file Icon database is performed on a byte-by-byte basis.

19. The system for identifying Icons of claim 14, further comprising:
taking one or more actions to protect a user of the given user computing system if the extracted relevant image data from the given .ico file matches with known/clean Icon image data obtained from the known/clean file Icon database to at least the defined threshold match level.

20. The system for identifying Icons of claim 19, wherein:
at least one of the one or more actions taken to protect a user of the given user computing system is selected from the group of protective actions consisting of:
quarantining the given file;
performing further analysis of the given file;
blocking the given file; and
generating a warning to the user regarding the given file.

* * * * *